(12) United States Patent
Finn

(10) Patent No.: US 11,565,208 B2
(45) Date of Patent: Jan. 31, 2023

(54) AIR FILTER ELEMENT WITH PRE-CLEANING TUBES

(71) Applicant: Caterpillar Inc., Peoria, IL (US)

(72) Inventor: Timothy S. Finn, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 37 days.

(21) Appl. No.: 17/353,958

(22) Filed: Jun. 22, 2021

(65) Prior Publication Data

US 2022/0401865 A1 Dec. 22, 2022

(51) Int. Cl.
*B01D 46/00* (2022.01)
*B01D 46/16* (2006.01)
*F02M 35/024* (2006.01)

(52) U.S. Cl.
CPC ......... *B01D 46/0002* (2013.01); *B01D 46/16* (2013.01); *F02M 35/02416* (2013.01); *B01D 2265/028* (2013.01); *B01D 2279/60* (2013.01)

(58) Field of Classification Search
CPC .............. B01D 46/0002; B01D 46/16; B01D 2265/028; B01D 2279/60; F02M 35/02416
See application file for complete search history.

(56) References Cited

U.S. PATENT DOCUMENTS

| | | | |
|---|---|---|---|
| 4,130,405 A * | 12/1978 | Akado | B01D 46/0004 55/DIG. 28 |
| 5,545,241 A | 8/1996 | Vanderauwera et al. | |
| 5,863,424 A * | 1/1999 | Lee | B01D 29/96 210/450 |
| 8,292,984 B2 | 10/2012 | Baseotto et al. | |
| 8,414,675 B2 | 4/2013 | Iddings et al. | |
| 8,702,831 B2 | 4/2014 | Scott et al. | |
| 9,127,625 B2 | 9/2015 | Kaiser | |
| 9,567,949 B2 | 2/2017 | Desnoe et al. | |
| 10,343,092 B2 * | 7/2019 | Jainek | F16J 15/025 |
| 2005/0235620 A1 * | 10/2005 | Connor | B01D 46/88 55/498 |
| 2011/0219735 A1 * | 9/2011 | Li | F02M 35/024 55/480 |
| 2014/0144110 A1 * | 5/2014 | Wood | B01D 46/0036 55/482 |
| 2015/0075127 A1 | 3/2015 | Schmid et al. | |
| 2016/0305375 A1 * | 10/2016 | Finn | B01D 46/62 |
| 2017/0296949 A1 * | 10/2017 | Krull | B01D 29/56 |
| 2020/0061503 A1 * | 2/2020 | Page | B01D 35/30 |

FOREIGN PATENT DOCUMENTS

| | | | | |
|---|---|---|---|---|
| CN | 106438131 A | * | 2/2017 | ........... F02M 35/024 |
| DE | 19647074 C1 | * | 6/1998 | ........ B01D 46/0002 |
| DE | 202007012690 | | 2/2009 | |
| EP | 0608034 | | 7/1994 | |
| JP | H09503431 A | * | 4/1997 | |
| JP | 2019519367 A | * | 7/2019 | |
| WO | WO-2016146250 A1 | * | 9/2016 | |
| WO | WO-2020021418 A1 | * | 1/2020 | ............. B01D 17/02 |
| WO | WO-2020128190 A1 | * | 6/2020 | ........ B01D 46/0005 |

* cited by examiner

*Primary Examiner* — Hung Q Nguyen

(57) ABSTRACT

An air filter subassembly includes a filter element with a pre-cleaner tube member that is snapped onto the filter element.

20 Claims, 7 Drawing Sheets

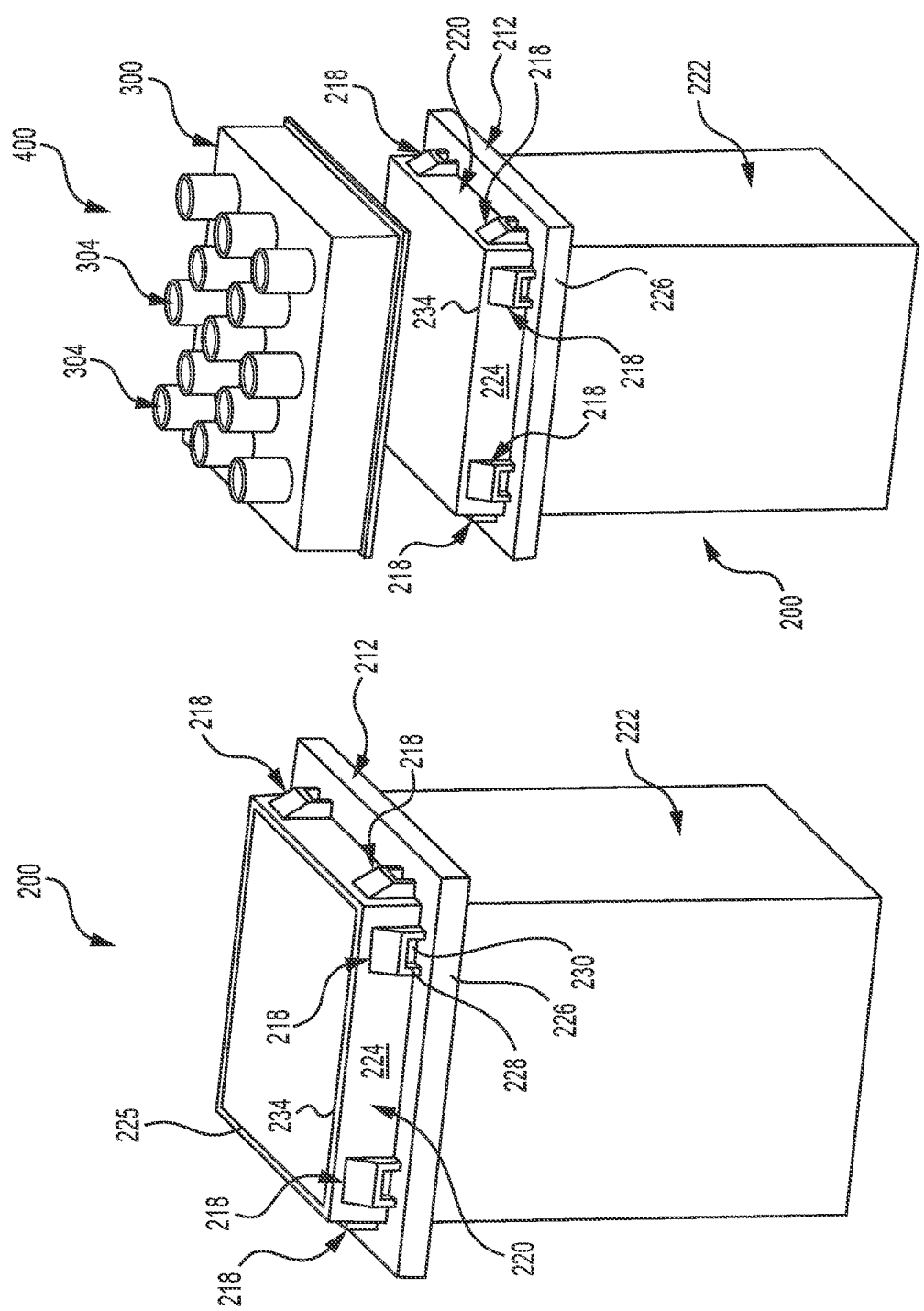

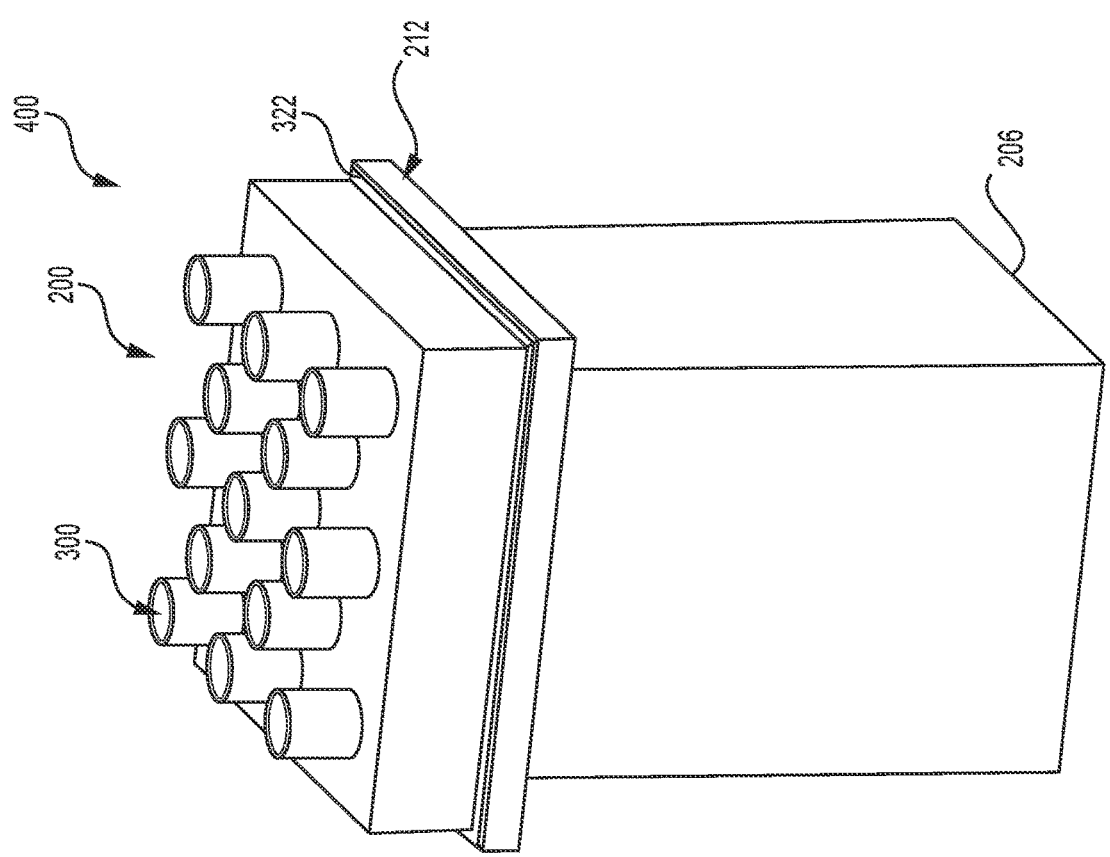

AIR FILTER ELEMENT WITH PRE-CLEANING TUBES

TECHNICAL FIELD

The present disclosure relates to air filter assemblies used in engines. Specifically, the present disclosure relates to such air filters that include a filter element that may be adapted to fit into differently configured housings for the air filter assembly.

BACKGROUND

In order to for an engine to convert chemical energy stored in fuel into mechanical work, the engine utilizes air from the surrounding environment to cause the fuel to combust. However, because the air in the surrounding environment is often laden with debris particles (e.g., dust, sand, or other contaminants), which may damage components of the engine and/or cause inefficient combustion, etc., air filter assembles are employed to clean the incoming air.

More specifically, these air filter assemblies may be sized along with their filter elements to accommodate different sized engines for more air throughput or less air throughput as needed or desired. The features or components used for one air filter assembly do not necessarily fit with those of another air filter assembly, etc. Moreover, different structural compatibility is sometimes needed for different systems.

Some air filter assemblies differ in design with regards to the service cover and the primary filter element. Whereas the pre-cleaner top and bottom tubes are contained within the service cover of some air filter assemblies, others separate them between the cover and the top of the primary element. The service covers are different due to design constraints such as whether a drop tube is desired. When the drop tube is part of the cover, the potential exists for additional components to be attached (scavenger, long evacuator valves, etc.). These components usually need to be removed with hand tools in order to perform routine maintenance of the air filter assembly.

In some cases, no such difference is necessary. That is to say, a separate drop tube is no longer needed or required. Accordingly, standardization of components between differently sized air filter assemblies may be possible.

Also, some designs allow the bottom pre-cleaner tubes to be attached to the top of the primary filter element. As a result, the service cover does not extend into the housing, which eliminates an area where dust or other contaminants are known to build up over time.

In other designs, the top and the bottom pre-cleaner tubes are both contained in the service cover, which extends into the housing. This creates an area where dust or other contaminants are known to build up over time in the housing. This occurs in the area of the housing where the pre-cleaner/cover resides in the assembled state. Although gaskets and seals have been added to the cover, dust still accumulates in enough quantity to cause issues during filter element assembly. If the residual dust is not effectively cleaned out of the housing before the primary element is installed, it can become trapped in between the seal of the element and the seal bead on the housing which results in an incomplete seal. This then leads to dust bypass and potential damage to the downstream components (turbo, engine, etc.).

Without the requirement that the dust evacuation drop tube be attached to the housing of the air filter assemblies, the cover design can be changed to eliminate the possibility of dust buildup as just described. However, it would also be desirable to come up with a solution that is retrofittable to existing air filter housings already in the field. In particular, some air filter assemblies already in the field require that the pre-cleaner provide the load on the seal of the primary filter element. Changing the design may not provide this necessary load to provide an adequate seal.

Provisions can be added to the primary filter element in order to allow compression of its seal by other means. However, adding those provisions prohibits the element from fitting into some of the existing housings already in the field. In addition, it is desirable to control parts proliferation, standardize the product for customers, and avoid the costs associated with lower volume custom parts.

U.S. Pat. No. 9,127,652 B2 discloses an air filter for a fresh air system of an internal combustion engine that may include a housing having a first housing shell and a second housing shell. An intermediate panel may be disposed therebetween separating a dirty chamber from a clean chamber in the housing. The intermediate panel may have a passage opening. A filter element may be arranged in the passage opening, and the filter element may include a surrounding seal. The intermediate panel may include a surrounding seal contour on an inside edge bordering the passage opening, and the seal may rest on the seal contour. A fixing frame may be configured as a separate component with respect to the intermediate panel, the two housing shells, and the filter component. The fixing frame may encompass a side of the seal facing away from the seal contour along the filter element and be secured to the intermediate panel.

As can be seen, a suitable method and apparatus for providing a retrofit for air assemblies in the field, limiting the number of different components for different air filter assemblies while also decreasing the aforementioned problems with dust buildup has yet to be devised.

SUMMARY

A filter element according to an embodiment of the present disclosure may comprise an upper portion, a lower portion, and a rim portion that separates the upper portion from the lower portion. The rim portion may define an outer peripheral surface, whereas the upper portion may define an inner peripheral surface that is inwardly offset from the outer peripheral surface of the rim portion. A first snap feature may protrude outwardly from the inner peripheral surface of the upper portion.

An air filter subassembly according to an embodiment of the present disclosure may comprise a filter element including an upper portion, a lower portion, and a rim portion that separates the upper portion from the lower portion, the rim, defining an outer peripheral surface. The upper portion may define an inner peripheral surface that is inwardly offset from the outer peripheral surface of the rim portion, and a first female snap feature or a first male snap feature may protrude outwardly from the inner peripheral surface of the upper portion. A pre-cleaner tube member may also be provided that includes a top wall, a plurality of pre-cleaner tubes, and an annular wall spaced outwardly from the plurality of pre-cleaner tubes. The other of a first male snap feature that is configured to mate with the first female snap feature or the other of the first female features that is configured to mate with the first male features of the of the upper portion of the filter element may extend from the top wall, or the annular wall.

A pre-cleaner tube member according to an embodiment of the present disclosure may comprise a shell member including a top wall and an annular wall extending from the top wall, a plurality of pre-cleaner tubes extending upwardly from the top wall, and downwardly through the top wall, forming a plurality of apertures, and a plurality of snap features extending downwardly from the top wall. The annular wall may be spaced away from the plurality of apertures, and the plurality of snap features may be disposed between the annular wall and the plurality of apertures.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 3 is a front oriented perspective view of the filter element of the filter assembly of FIG. 1, removed from the assembly.

FIG. 4 is an exploded assembly view illustrating the lower pre-cleaner tube member being attached to the filter element of FIG. 3 via snap features.

FIG. 8 shows the subassembly that results from the operation of FIG. 4 after snapping the lower pre-cleaner tube member to the filter element.

DETAILED DESCRIPTION

Figure 1:
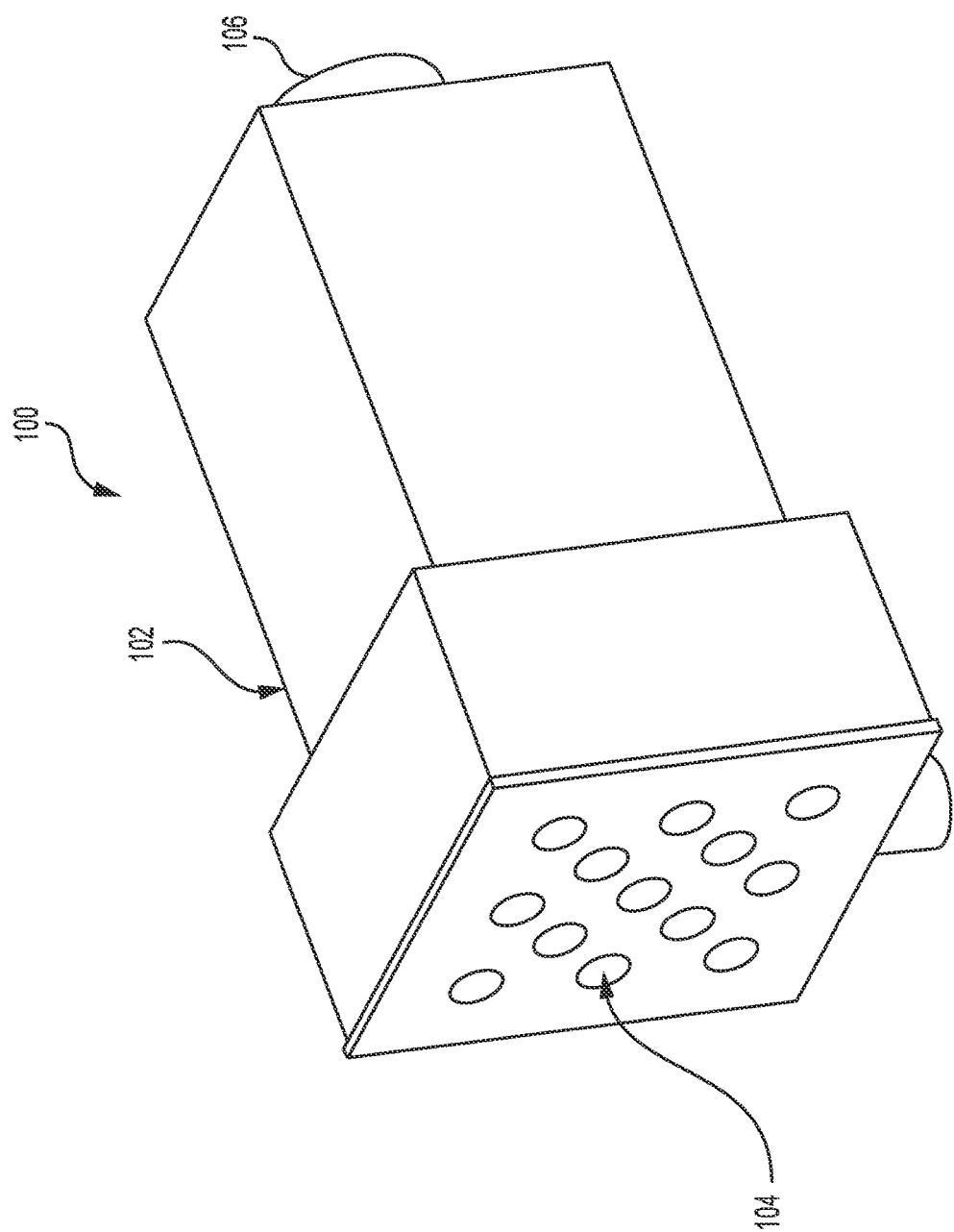
FIG. 1 is a perspective view of a filter assembly according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include an air filter assembly having a housing, and a plurality of components disposed in the housing such as a filter element, a bottom pre-cleaner tube member, and a top pre-cleaner tube member (or service cover). In particular, embodiments of the filter element and snap on lower pre-cleaner tube member of the present disclosure may be used with housings existing already in the field. The filter element may also be used with and adapter collar to fit with a new housing. In either case, the aforementioned problem of contamination buildup in the air filter assembly may be reduced in some situations.

First, an air filter assembly according to an embodiment of the present disclosure will be described with reference to FIGS. 1 thru 8.

Figure 2:
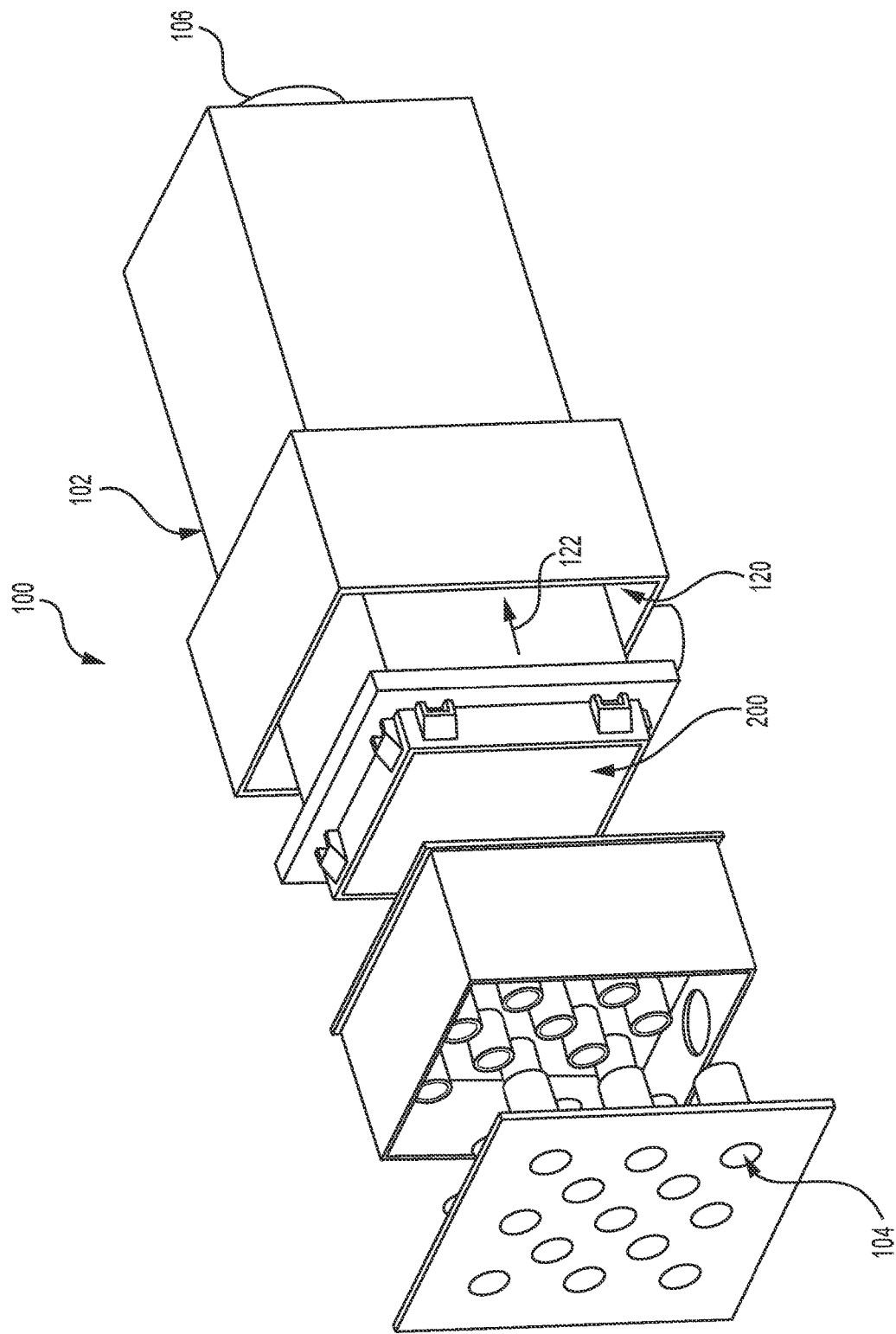
FIG. 2 is an exploded assembly view of the filter assembly of FIG. 1, revealing a filter element having snap features.
Figure 6:
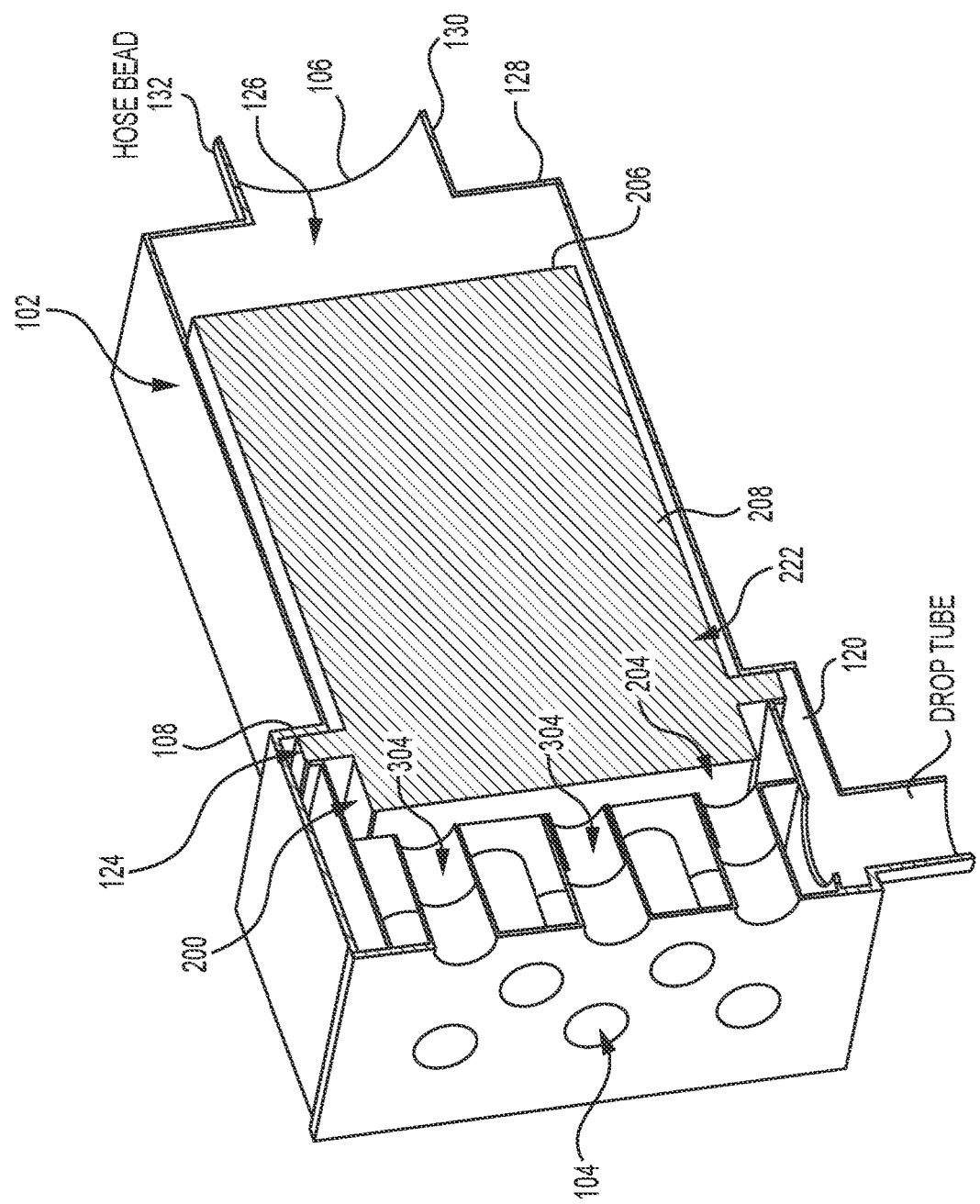
FIG. 6 is a sectional view of the filter assembly of FIG. 1.
Figure 7:
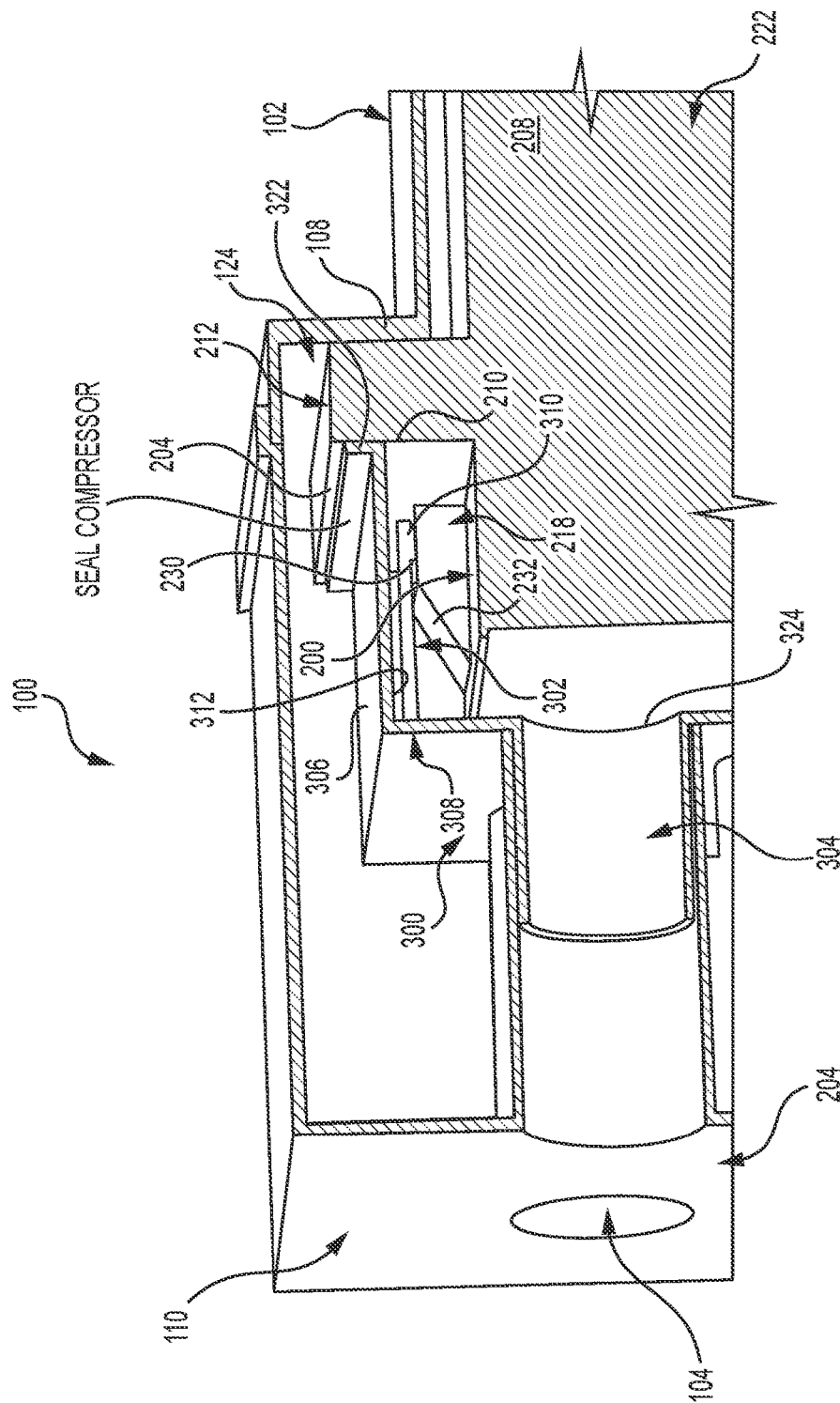
FIG. 7 is an enlarged sectional view similar to that of FIG. 7, showing mating of the male snap feature(s) of the lower pre-cleaner tube member and the female snap feature of the filter element.

Starting with FIGS. 1 and 2, such an air filter assembly 100 may comprise a housing 102 defining an entrance 104, an exit 106, and a ledge 108 therebetween, as well as a filter element 200 disposed in the housing 102, mating with the ledge 108 (see also FIGS. 6 and 7).

As seen in FIG. 7, a top pre-cleaner member (or service cover 110) may be disposed in or on top of the housing 102 above the lower pre-cleaner tube member 300. In addition, a safety seal member (not shown) may be disposed below the filter element 200, and proximate to the exit 106 of the housing 102. The safety seal member may be manufactured from any suitably resilient material such as an elastomer, a rubber, a plastic, etc. In some applications, the safety seal member may have a nylon molded frame containing cellulose filtering material (not shown), and a perimeter seal bead (not shown) made from urethane. Other constructions and configurations are possible in other embodiments of the present disclosure.

The purpose of the safety seal member is to prevent contaminants from entering the engine during filter element replacement. The safety seal member may be replaced in a maintenance facility every third time the filter element is replaced.

Looking at FIGS. 6, 7 and 8, the filter element 200 may include a molded plastic preformed protective shell (preform) that extends from a first inlet face 204 to an opposite outlet face 206 (see FIG. 6). A filter media pack 208 is typically positioned within the shell (may fill up the lower portion 222), and held in place by a urethane seal 210 around an upper extent of the filter media pack 208 in the vicinity of a rim portion 212, as well as adhesive provided between the sides of the filter media pack 208 and the preform shell. Elements or ribs (not shown) are also typically provided across the upper extent of the filter media pack, extending between portions of the peripheral rim (also called the rim portion). A service handle (not shown) may also be joined to opposite sides of the protective shell at or proximate to the portions of the peripheral rim at the inlet face of the protective shell. The service handle (not shown) may extend across the inlet face 204, providing a feature for grasping the filter element 200, and inserting and removing the filter element 200 into and out of the housing 102 of the air filter assembly 100.

The preform protective shell may be aligned with a matching cavity 120 extending into an entrance 104 of the housing 102. The filter element 200 is then inserted into the matching cavity in the entrance of the housing in the direction of the arrow 122 shown in FIG. 2.

As best seen in FIGS. 6 and 7, when installed into the housing 102, the filter element 200 typically fills a first inlet section 124 of the housing 102. Filtered air leaving the filter media pack 208 of the air cleaner may then pass through an outlet section 126 with a converging portion 128 (may be funneled shaped) of the housing 102 directing the filtered air into a hose connector 130 with a hose bead 132. The converging portion 128 of the outlet section 126 may include one or more sensor ports and/or bosses (not shown) configured for supporting sensors that extend into an inner volume of the outlet section. The hose connector is configured for fluidly connecting the housing to a hose or conduit coupled to an air intake of an engine. The housing for a high flow air filter, such as the air filters used on engines for large trucks or power generating plants, is generally a large and bulky metal structure that is mounted, for example, by mounts (not shown), on an engine or in an engine compartment in close proximity to an air intake for the engine.

Focusing now on FIG. 8, it may be understood that when a lower pre-cleaner tube member 300 is attached to the filter element 200, that an adapter collar may omitted since the pre-load forming the seal is provided by the lower pre-cleaner tube member rather than by the adapter collar.

In FIG. 3, the filter element 200 may include a plurality of female snap features 218, while the lower pre-cleaner tube member 300 may include a plurality of male snap features 302 (see FIGS. 5 and 7) that are configured to mate with the plurality of female snap features 218 of the filter element 200. It is contemplated that the male and female snap features may be swapped from the lower pre-cleaner tube member, to the filter element, and vice versa in other embodiments of the present disclosure.

With continued reference to FIG. 3, it can be seen that the filter element 200 may include a rim portion 212 that is configured to mate with the ledge 108 of housing 102 in FIG. 7 as mentioned earlier herein. This rim portion 212 may separate the filter element into a first portion 220, and a second portion 222. As seen in FIG. 3, the second portion 222 extends further away from the rim portion 212 than the first portion 220 along the direction of assembly (see arrow 122) since it is the second portion that contains most of the filter media. Also, the first portion 220 includes a side surface 224 that is inwardly offset from the rim portion 212, and the plurality of female snap features 218 may extend outwardly from the side surface 224. This may not be the case for other embodiments of the present disclosure.

It should also be noted that the top surface 225 of the filter element 200 may include a series of interconnected ribs (not shown) that stop at the side surface 224, but not necessarily so. Previously, these ribs extended downwardly along the side surface in other designs of the filter element. Eliminating these ribs allowed the addition of the female snap features.

Since the filter element 200 needs to be replaced or maintained from time to time to remove the clogged filter media, the filter element 200 may be considered a replacement part that may be provided separately from the air filter assembly 100.

Consequently, such an embodiment of the filter element 200 will now be discussed with continued reference to FIG. 3. Such a filter element 200 may comprise an upper portion (e.g., see first portion 220), a lower portion (e.g., see lower portion 222), and a rim portion 212 that separates the upper portion from the lower portion. The rim may define an outer peripheral surface 226 (e.g., an outermost peripheral surface of the filter element).

More specifically, the upper portion may define an inner peripheral surface (e.g., see side surface 224) that is inwardly offset from the outer peripheral surface 226 of the rim portion 212. A first snap feature (e.g., see female snap feature 218) may protrude outwardly from the inner peripheral surface of the upper portion.

As shown in FIG. 3, the first snap feature may take the form of a first female snap feature 218, but not necessarily so. In other embodiments, the first snap feature may take the form of a male snap feature. As shown, a plurality of snap features (e.g., female snap feature 218) including the first snap feature may protrude outwardly from the inner peripheral surface of the upper portion. Each of the snap features (e.g., female snap feature 218) may be similarly or identically configured.

More particularly, the first female snap feature 218 may include a first U-shaped portion 228 (e.g., an upside down U-shaped portion) that defines a recess 230 that is adjacent to the rim portion 212. An inclined wedge portion 232 may be connected to the first U-shaped portion 228, and the inner peripheral surface (e.g., see side surface 224). The inclined wedge portion 232 is shown to be proud of the inner peripheral surface. However, it is possible that an inclined surface may be provided that is recessed inwardly from the inner peripheral surface in other embodiments of the present disclosure.

As alluded to earlier herein, the inner peripheral surface 224 (see FIGS. 3 and 4) may lack any other protrusion except the plurality of snap features, while the upper portion of the filter element may include a top surface including a web of interconnected ribs. The inner peripheral surface may have any suitable perimeter 234 such as polygonal, oval, circular, etc. When polygonal, a rectangular or square configured perimeter may be provided such as shown in the figures.

As also alluded to earlier herein, most or all of the filter element may be manufactured from a hollow molded shell. One or more sets of filter media may be disposed in the hollow molded shell.

Now, an air filter subassembly 400 that may also be provided as a replacement kit will be discussed.

In FIGS. 3 thru 7, the air filter subassembly 400 may comprise a filter element 200 including an upper portion (e.g., see first portion 220), a lower portion (e.g., see first portion 222), and a rim portion 212 that separates the upper portion from the lower portion. The rim may define an outer peripheral surface 226. The upper portion may define an inner peripheral surface (e.g., side surface 224) that is inwardly offset from the outer peripheral surface 226 of the rim portion 212, and a first female snap feature 218 or a first male snap feature may protrude outwardly from the inner peripheral surface of the upper portion.

Figure 5:
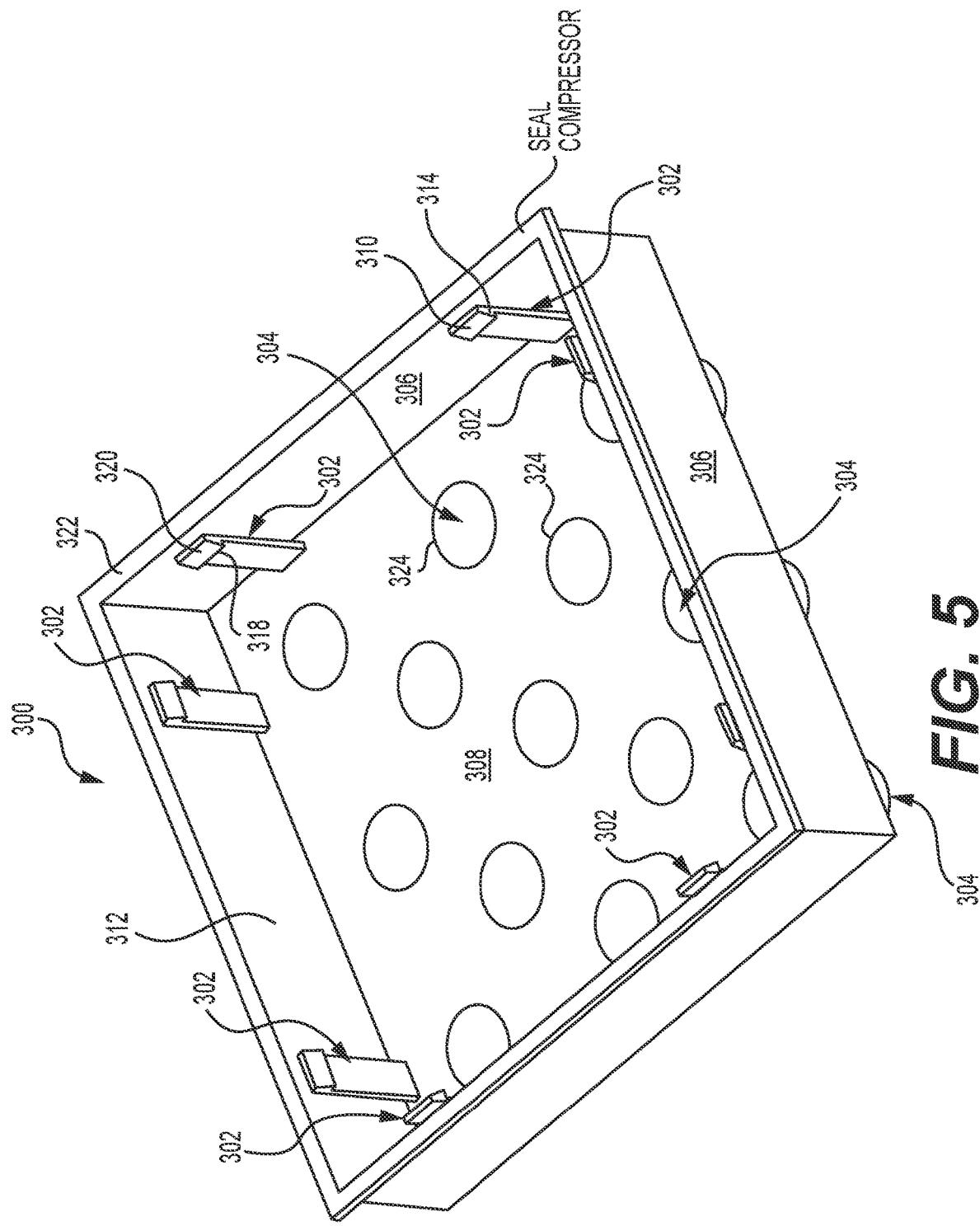
FIG. 5 is a bottom perspective view of the lower pre-cleaner tube member of FIGS. 4 and 5, revealing its male snap features.

Looking at FIGS. 5, 6 and 7, a pre-cleaner tube member (e.g., the lower pre-cleaner tube member 300) may be provided that includes a plurality of pre-cleaner tubes 304, and an annular wall 306 that is spaced outwardly from the plurality of pre-cleaner tubes 304. These tubes may extend from the top wall 308. More specifically, the pre-cleaner tubes may extend upwardly from the top wall, and downwardly through the top wall, forming a plurality of apertures 324 (see FIG. 5)

In FIG. 5, an inner surface of the annular wall 306 may include the other of a first female snap feature or the other of a first male snap feature 302 that is configured to mate with the first female snap feature 218 or the first male snap feature of the upper portion (e.g., see first portion 220) of the filter element 200. As shown, the first male snap feature 302 extends downwardly from the top wall 308 and is spaced away from the annular wall 306 to allow the male snap feature to defect toward the annular wall as during the assembly process as the male snap feature contacts inclined wedge portion of the female snap feature.

For the embodiments shown in FIGS. 3 thru 7, the upper portion includes a first female snap feature 218 whereas the pre-cleaner tube member 300 includes a first male snap feature 302 that is configured to mate with the first female snap feature 218 of the filter element 200. The first female snap feature includes a first U-shaped portion 228 that defines a recess 230 that is adjacent to the rim portion 212. Other configurations are possible in other embodiments of the present disclosure.

On the other hand, as best seen in FIGS. 5 and 7, the first male snap feature 302 of the pre-cleaner tube member 300 may include a first snap hook 310 extending from inwardly from the inner surface 312 of the annular wall 306 or the top wall 308 of the pre-cleaner tube member 300. Looking at the side of the first snap hook, it may be appreciated that the first snap hook may include a triangular profile 314. Also, the first snap hook 310 is disposed proximate to the rim portion 212 (or the annular wall 306 of the pre-cleaner tube member 300) of the filter element 200 once assembled (see FIG. 7), allowing the first snap hook 310 to engage the recess 230 of the first female snap feature 218.

As mentioned earlier herein, the upper portion of the filter element may include a plurality of similarly or identically configured female snap features including the first female snap feature whereas the pre-cleaner tube member may include a plurality of similarly or identically configured male snap features. Each male snap feature may be configured to mate with a corresponding female snap feature of the pre-cleaner member.

To provide interchangeability, the snap features of the pre-cleaner tube member may be similarly or identically configured as those of the adapter collar (not shown).

Again, for any of the embodiments discussed herein, the materials, and features may be modified in configuration, material, or omitted in various embodiments of the present disclosure, etc. For example, the housing may be made from sheet metal, or molded from a plastic, etc. Also, the adapter collar, the filter element outer shell, the pre-cleaner member outer shell, the pre-cleaner tubes, etc., may be molded from a plastic, etc.

INDUSTRIAL APPLICABILITY

In practice, an air filter assembly, a filter element, an adapter collar, a pre-cleaner tube member, and/or an air filter subassembly may be sold, manufactured, bought etc. and in the aftermarket or original equipment manufacturer (OEM) scenarios according to any of the embodiments discussed herein. That is to say, the components, subassembly, and/or assembly may be sold with an engine or a machine using an engine in the OEM (original equipment manufacturer) or aftermarket contexts.

In use, a technician may choose whether the air filter assembly may use an existing housing or a newly designed housing.

When a retrofit housing design is chosen, then a filter element and a pre-cleaner tube member as described earlier herein may be employed.

In particular, the pre-cleaner tube member may be provided separately. Such an embodiment will now be described with reference to FIG. 6.

This pre-cleaner tube member 300 may comprise a shell member 316 including a top wall 308, and an annular wall 306 extending from the top wall 308. A plurality of pre-cleaner tubes 304 may extend upwardly from the top wall 308, as well as a plurality of snap features (e.g., see male snap features 302). The annular wall 306 may be spaced away from the plurality of pre-cleaner tubes 304, and the plurality of snap features may be disposed between the annular wall and the plurality of apertures 324 formed by the pre-cleaner tubes.

Looking at FIG. 5, each of the plurality of male snap features 302 may include a snap ledge 318, and a lead-in surface 320 extending from the snap ledge 318. The lead-in surface may aid in deflecting the male snap feature until it reaches the recess of the female snap feature. As shown, the lead-in surface 320 faces inwardly toward the plurality of pre-cleaner tubes 304 (or the apertures 324 formed by these tubes). This may not be the case for other embodiments of the present disclosure. A flange 322 (may act as a seal compressor) may extend outwardly from the annular wall that contacts the rim portion of the filter element when assembled.

It is to be understood that pry features may be provided on the pre-cleaner tube member when it is attached to the filter element using snap features to aid with disassembly. Such features are not shown since the design intent for the embodiment shown in the drawings is that the filter element and the pre-cleaner tube will be replaced at the same time. This may not be the case for other embodiments of the present disclosure.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A filter element comprising:
   an upper portion;
   a lower portion; and
   a rim portion that separates the upper portion from the lower portion, the rim portion defining an outer peripheral surface;
   wherein the upper portion defines an inner peripheral surface that is inwardly offset from the outer peripheral surface of the rim portion, and further includes a first snap feature that protrudes outwardly from the inner peripheral surface of the upper portion.

2. The filter element of claim 1, wherein the first snap feature is a first female snap feature.

3. The filter element of claim 2, wherein the first female snap feature includes a first U-shaped portion that defines a recess that is adjacent to the rim portion.

4. The filter element of claim 3, wherein the upper portion includes an inclined wedge portion that is connected to the first U-shaped portion.

5. The filter element of claim 1, further comprising a plurality of snap features including the first snap feature that protrude outwardly from the inner peripheral surface of the upper portion, and wherein the filter element further includes filter media in the lower portion.

6. The filter element of claim 5, wherein the inner peripheral surface lacks any other protrusion except the plurality of snap features, and includes a polygonal perimeter.

7. The filter element of claim 6, wherein the polygonal perimeter is square or rectangular.

8. An air filter subassembly comprising:
- a filter element including
  - an upper portion;
  - a lower portion; and
  - a rim portion that separates the upper portion from the lower portion, the rim defining an outer peripheral surface;
  - wherein the upper portion defines an inner peripheral surface that is inwardly offset from the outer peripheral surface of the rim portion, and a first female snap feature or a first male snap feature that protrudes outwardly from the inner peripheral surface of the upper portion; and
- a pre-cleaner tube member including
  - a top wall;
  - a plurality of pre-cleaner tubes;
  - an annular wall spaced outwardly from the plurality of pre-cleaner tubes;
  - wherein the other of a first female snap feature or the other of a first male snap feature that is configured to mate with the first female snap feature or the first male snap feature of the upper portion of the filter element extends from the top wall, or the annular wall.

9. The air filter subassembly of claim 8, wherein the upper portion includes a first female snap feature whereas the pre-cleaner tube member includes a first male snap feature that is configured to mate with the first female snap feature of the pre-cleaner member.

10. The air filter subassembly of claim 9, wherein the first female snap feature includes a first U-shaped portion that defines a recess that is adjacent to the rim portion.

11. The air filter subassembly of claim 9, wherein the first male snap feature includes a first snap hook extending from the top wall of the pre-cleaner tube member.

12. The air filter subassembly of claim 11, wherein the first snap hook includes a triangular profile.

13. The air filter subassembly of claim 11, wherein the first snap hook is disposed proximate to the annular wall.

14. The air filter subassembly of claim 11, wherein the first snap hook engages the recess of the first female snap feature.

15. The air filter subassembly of claim 9, wherein the upper portion includes a plurality of female snap features including the first female snap feature whereas the pre-cleaner tube member includes a plurality of male snap features including the first male snap feature that is configured to mate with the first female snap feature of the pre-cleaner member.

16. A pre-cleaner tube member comprising:
- a shell member including a top wall and an annular wall extending from the top wall;
- a plurality of pre-cleaner tubes extending upwardly from the top wall, and downwardly through the top wall, forming a plurality of apertures; and
- a plurality of snap features extending downwardly from the top wall;
- wherein the annular wall is spaced away from the plurality of apertures, and the plurality of snap features are disposed between the annular wall and the plurality of apertures.

17. The pre-cleaner tube member of claim 16, the plurality of snap features are a plurality of male snap features.

18. The pre-cleaner tube member of claim 17, wherein each of the plurality of male snap features includes a snap ledge and a lead-in surface extending from the snap ledge.

19. The pre-cleaner tube member of claim 18, wherein the lead-in surface faces inwardly toward the plurality of apertures formed by the plurality of pre-cleaner tubes that extend through the top wall.

20. The pre-cleaner tube member of claim 16, further comprising a flange that extends outwardly from the annular wall.

* * * * *